United States Patent [19]

Shaide

[11] Patent Number: 5,518,291
[45] Date of Patent: May 21, 1996

[54] REMOVABLE AND ADJUSTABLE BACKREST AND STORAGE COMPARTMENT FOR A MOTORCYCLE, SCOOTER, MOPED OR OTHER VEHICLE

[76] Inventor: Ron Shaide, P.O. Box 463, Fairview, Mont. 59221

[21] Appl. No.: 238,022

[22] Filed: May 3, 1994

[51] Int. Cl.⁶ .................................................. B62J 1/00
[52] U.S. Cl. ............... 297/215.12; 297/383; 297/188.04; 297/188.2
[58] Field of Search ........................... 297/215.1, 215.12, 297/191, 230.14, 383, 188.05, 188.07, 188.20, 188.04

[56] References Cited

U.S. PATENT DOCUMENTS

| | | |
|---|---|---|
| D. 223,070 | 3/1972 | Heltzen et al. . |
| D. 272,140 | 1/1984 | Turkington et al. . |
| D. 286,519 | 11/1986 | Komuro . |
| D. 287,348 | 12/1986 | Larson . |
| D. 332,540 | 1/1993 | Peterson . |
| 3,698,762 | 10/1972 | Gorman . |
| 3,822,917 | 7/1974 | George . |
| 3,850,353 | 11/1974 | Foulds . |
| 3,940,166 | 2/1976 | Smithea ............................ 297/215.12 |
| 4,030,750 | 6/1977 | Abram . |
| 4,032,189 | 6/1977 | Benavente et al. . |
| 4,186,937 | 2/1980 | Schultz ............................. 297/215.11 |
| 4,269,335 | 5/1981 | LaRose et al. . |
| 4,311,261 | 1/1982 | Anderson et al. . |
| 4,447,088 | 5/1984 | Bodlovic . |
| 4,466,660 | 8/1984 | Mabie . |
| 4,549,629 | 10/1985 | Komuro . |
| 4,690,237 | 9/1987 | Funabashi et al. . |

*Primary Examiner*—Peter R. Brown
*Assistant Examiner*—Anthony D. Barfield
*Attorney, Agent, or Firm*—Pollock, Vande Sande & Priddy

[57] ABSTRACT

An integral backrest and storage compartment adapted to be attached to a motorcycle, scooter, or moped. The backrest and storage compartment includes a storage compartment base member adapted to be at least partially supported by an upper surface of a passenger seat of a motorcycle, scooter, or moped. Two storage compartment side members are attached on opposite sides of the storage compartment base member. A storage compartment front member is attached to the storage compartment base member and the storage compartment side members on a side of the storage compartment. A storage compartment rear member is attached to the storage compartment base member and the storage compartment side members. A storage compartment cover is articulately joined to one of the group consisting of: the storage compartment rear member, the storage compartment front member, and the storage compartment side members. At least one mounting strap is adapted to secure the storage compartment to a motorcycle, scooter, or moped. A front face of a backrest member is adapted to provide support for a back of a rider of a motorcycle, scooter, or moped. At least one backrest mounting member extends rearwardly away from a rear face of the backrest member. At least one backrest mounting member receiving slot is provided in a face of the storage compartment. At least one backrest mounting member receiving slot receives the at least one backrest mounting member.

12 Claims, 9 Drawing Sheets

5,518,291

REMOVABLE AND ADJUSTABLE BACKREST AND STORAGE COMPARTMENT FOR A MOTORCYCLE, SCOOTER, MOPED OR OTHER VEHICLE

FIELD OF THE INVENTION

The invention relates to a detachable backrest and/or storage compartment to be attached to a motorcycle, scooter, or moped.

BACKGROUND OF THE INVENTION

In recent times, motorcycles, scooters, and mopeds have become increasingly popular forms of transportation. Motorcycles in particular have become much more widely used for everyday commuting to and from work and for both long and short recreational trips. The market for two-wheeled vehicles has become greater and more valuable to the manufactures of the vehicles and dealers in the vehicles and vehicle accessories.

As motorcycles, in particular, have become a more popular form of transportation, attempts have been made to increase the comfort of the operators of motorcycles. Since riders of two-wheeled vehicles are completely exposed to the elements, their comfort is a more significant issue than with typical cars, trucks, and other four wheeled vehicles. Additionally, riders of two-wheeled vehicles must always be sitting upright, straddling the seat, and holding on to the handle bars, with little or no back support. With rider and passenger comfort being such an important issue, the attempt to increase the comfort level the comfort level of motorcycles has been accompanied by an increase in the development and market for motorcycle accessories installed by the manufacturer and after market devices installed by owners or third parties.

One area in particular in which the development of motorcycle accessories has been concentrated is devices increasing the comfort of the rider's seat. A typical motorcycle, scooter and moped seat includes a first contoured seat for the driver as well as an extension which may be attached rearwardly of the driver's seat. The extension, which provides a place for a passenger, usually is also contoured to adapt to the bottom of the rider. The passenger seat may also be attached to the motorcycle to the rear of the main seat where the driver sits separate from the driver's seat.

To provide for the comfort and safety of the passenger, motorcycles often include a backrest or sissy bar attached to the motorcycle behind the passenger seat. This backrest or sissy bar can provide a certain amount of comfort for a passenger by providing a place for the passenger rest his or her back. By providing a place for a passenger to hold on, the backrest or sissy bar may also provide a certain stability for the passenger which the passenger cannot obtain from holding onto the handlebars as the driver does. However, since the driver must sit in the driver's seat to reach the handlebars, even if unaccompanied by a passenger, the backrest or sissy bar is attached to the motorcycle too far back to be of use in increasing the comfort level of the driver of the motorcycle. Therefore, a need exists to increase the comfort level of motorcycle riders.

In addition to the great desire for after market devices enhancing the comfort of riders of two-wheeled vehicles, another perpetual problem which exists with two-wheeled vehicles is that of insufficient storage space. A lack of any significant storage space is inherent in the design of two-wheeled vehicles. Unlike four-wheeled vehicles, such as, for example, cars, which have a trunk, and trucks, which have a bed, two-wheeled vehicles do not have such storage capacity. Storage capacity is a necessity, whether riding a two-wheeled vehicle to work, or on a long road trip. In order to solve the storage problem with two-wheeled vehicles, there has developed a market for devices allowing for carrying of articles.

SUMMARY OF THE INVENTION

The present invention was developed to solve problems, such as those discussed above, existing with two-wheeled vehicles. The present invention was also developed to solve problems existing with known solutions to problems with two-wheeled vehicles. Some known devices for increasing the comfort of drivers of two-wheeled vehicles require attachment to the frame of the two-wheeled vehicle. Alternatively, other devices require modification of the vehicle body. Further, most device for increasing the comfort of drivers of two-wheeled vehicles require much time and effort to attach to or detach from the vehicle.

Accordingly, one of the objects of the present invention is to provide an easily attachable and detachable device for increasing the comfort of a driver of a two-wheeled vehicle.

Another object of the present invention is to provide an adjustable device for increasing the comfort of a driver of a two-wheeled vehicle.

A further object of the present invention is to provide a storage compartment for a two-wheeled vehicle.

An additional object of the present invention is to provide a storage compartment for a two-wheeled vehicle which can be easily attached to and detached from the two-wheeled vehicle.

A still further object of the present invention is to provide a storage compartment for a two-wheeled vehicle in combination with a device to increase the comfort of a driver of a two-wheeled vehicle.

A further additional object of the present invention is to provide a storage compartment for a two-wheeled vehicle in combination with a device to increase the comfort of a driver of a two-wheeled vehicle which is adjustable.

According to preferred aspects, the present invention provides a removable, adjustable backrest for any motorcycle, scooter, or moped. The backrest includes a backrest assembly comprising a backrest member providing support for the back of a rider of the motorcycle, scooter, or moped. The backrest assembly also includes a base member extending rearwardly at an angle from the backrest member. The backrest also includes a backrest mounting assembly which is secured to the motorcycle, scooter, or moped.

According to other aspects of the invention, a removable, adjustable backrest for a motorcycle, scooter or moped is provided. The backrest includes a backrest assembly including a backrest member providing support for a riders back and two backrest assembly base members extending rearwardly and downwardly at an angle from the backrest member. A backrest mounting assembly secures the backrest assembly to the motorcycle, scooter, or moped. The backrest mounting assembly includes a backrest mounting assembly base member and two backrest mounting assembly base members which adjustably receive the backrest assembly.

According to further aspects, the present invention provides a removable storage compartment for a motorcycle, scooter, or moped. The removable storage compartment includes a base member resting on an upper surface on a seat of a motorcycle, scooter, or moped. The removable storage compartment also includes two side members attached on opposite sides of the base member. These side members extend downwardly beyond the base member so as to engage opposite sides of the seat of the motorcycle, scooter, or moped. A front member is attached to the base member on a side facing a rider of the motorcycle, scooter, or moped. The sides of the front member are attached to the side members. The storage compartment also includes a rear member attached to a side of a base member opposite the front member. A cover is articulately joined to the rear member, front member or one of the side members. At least one securing strap secures the storage compartment to the motorcycle, scooter, or moped.

Still other objects and advantages of the present invention will become readily apparent those skilled in this art from the following detailed description, wherein it is shown and described only the preferred embodiments of the invention, simply by way of illustration of the best mode contemplated of carrying out the invention. As will be realized, the invention is capable of other and different embodiments, and it's several details are capable of modifications in various obvious respects, without departing from the invention. Accordingly, the drawings and description are to be regarded as illustrative in nature and not as restrictive.

DETAILED DESCRIPTION OF THE PREFERRED EMBODIMENTS OF THE INVENTION

Conventional two-wheeled vehicles, such as motorcycles, scooter, and mopeds are usually designed with two seats one behind the other. One seat, located forwardly on the vehicle, accommodates the driver of the vehicle. The driver's seat may contoured to accommodate the bottom of the driver. The other seat, which may also be contoured, provides a place for a passenger to sit. The passenger seat may or may not be joined to the driver's seat.

Usually, the vehicle includes a sissy bar behind the passenger seat so as to provide a backrest for the passenger. The sissy bar therefore provides a more comfortable seat for a passenger on a long trip, providing back support. However, such a sissy bar is only of use of a passenger on a motorcycle, scooter or moped; the sissy bar is too far back on the vehicle to be of use to the driver, who sits in the first seat.

Therefore, drivers of motorcycles, scooters, mopeds and similar vehicles are in need of some sort of structure to provide back support and therefore to make the driver more comfortable. This is especially useful and needed when a driver is riding alone for an extended period of time.

Devices which have attempted to provide the driver of a motorcycle with back support have required modification to the motorcycle scooter or moped to which the device is attached. Alternatively, known devices have required the use of tools in attaching them to a motorcycle, scooter, moped or other vehicle. Accordingly, the present was designed, in part, to provide a removable, adjustable backrest for a motorcycle, scooter or moped which is easily removed without the use of tools or modifications to the structure of the motorcycle, scooter, or moped.

Figure 1:
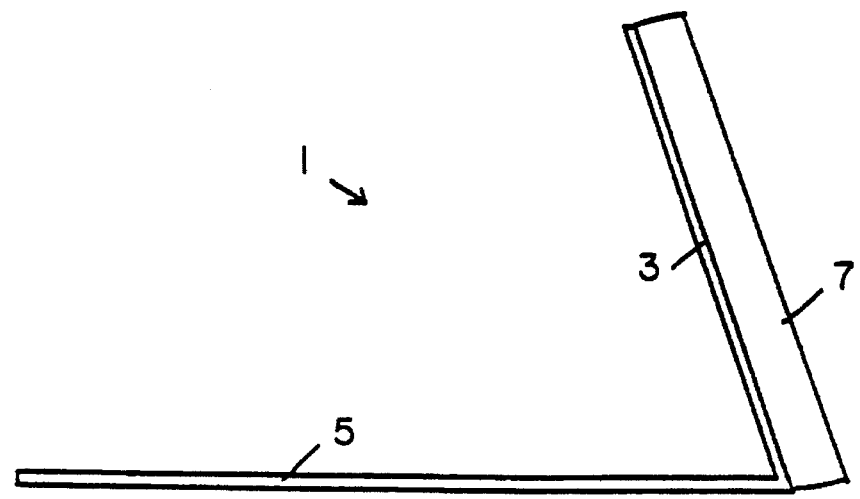
FIG. 1 represents a side view of one embodiment of a backrest assembly according to the present invention.

Accordingly, the present invention is a removable, adjustable backrest for a motorcycle, scooter, or moped. The backrest may also be used with a three-wheeled motorcycle, or motorcycle with a side-car or any other vehicle including a seat similar to that usually found on motorcycles and other two-wheeled vehicles. The backrest includes a backrest assembly and a backrest mounting assembly which secures the backrest assembly to the motorcycle, scooter, or moped. As shown in FIG. 1, the backrest assembly 1 comprises a backrest member 3. The backrest member provides support for the rider's back.

In the embodiment shown in FIG. 1, the backrest assembly may also include a backrest assembly base member 5 which is attached to the backrest member. The backrest assembly base member extends rearwardly from the backrest member in relation to the motorcycle, scooter, or moped when the backrest assembly is attached to the vehicle. The backrest assembly base member preferably is angled in relation to the backrest member 3 preferably, the angle between the backrest assembly base member and the backrest member is such that the rider will be comfortably supported by the backrest member when the backrest assembly is attached to a two-wheeled vehicle.

With the embodiment shown in FIG. 1 and all other embodiments described below, the backrest member and the backrest assembly base member may be made of wood, metal, plastic, composite materials, or any other suitable material which provides a structure of sufficient strength and having characteristics desired. The shape and size of the backrest member and the backrest assembly base member may vary, depending upon the requirements of the driver.

Preferably, to increase the comfort of the driver, a foam pad 7 may be attached to the side of the backrest member which would face the driver's back when the backrest is mounted on a vehicle. In one embodiment, the foam is about three inches thick. This thickness of padding provides a high comfort level to the driver. However, any thickness of pad may be attached to the backrest member. Alternatively, the backrest member may not be padded.

The leather or vinyl may be attached directly to the backrest member. For example, the foam may be attached directly to the backrest member using, an adhesive. Alternatively, the foam may be attached to the backrest member with straps which extend completely about the backrest member and the pad. The pad may also be attached with other any suitable means. The foam may be covered with a leather or a vinyl cover to protect it from the elements and to further increase driver comfort.

In an alternative embodiment, a foam cushion may be constructed separately and then attached to the backrest member. For example, the foam may be attached to a piece of wood or metal. A vinyl or leather cover may then be attached over the foam and wood, being secured to the side of the side piece of wood opposite the foam. The cushion may then be secured to the backrest member using, for example, adhesive, or the cushion may be bolted or otherwise secured to the backrest member.

The backrest preferably also includes a backrest mounting assembly. In some embodiments, the backrest mounting assembly may include at least one strap to secure the backrest assembly to the two-wheeled vehicle. In such embodiments, the strap(s) may be, for example, riveted to the backrest assembly. Other means may also be used to secure the strap(s) to the backrest assembly.

In an embodiment such as that shown in FIG. 1, the backrest assembly may be secured directly to a motorcycle or other two-wheeled vehicle with the at least one strap. For example, the strap could be wrapped about the seat of a motorcycle or other two-wheeled vehicle. Such embodiments of the backrest may not include any structure in addition to the backrest assembly shown in FIG. 1 and a backrest mounting assembly comprising a strap.

Figure 2:
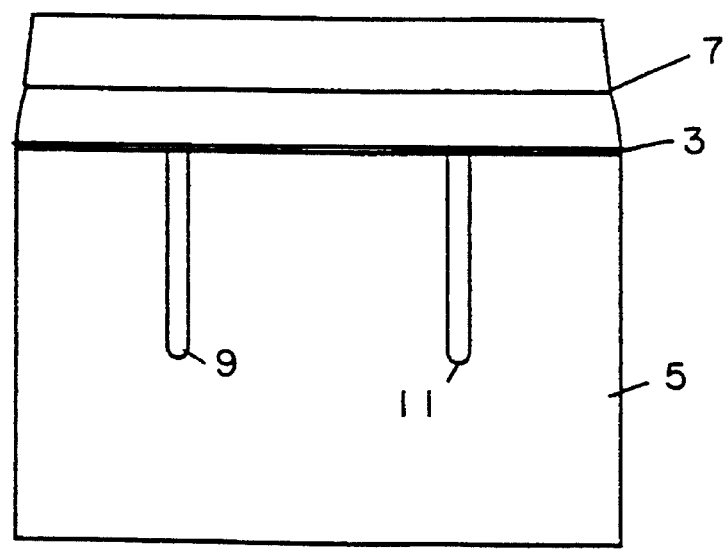
FIG. 2 represents an overhead view of the embodiment shown in FIG. 1.

The embodiment of the backrest assembly shown in FIG. 1 is shown from above in FIG. 2. Certain embodiments of the backrest assembly base member 5, such as that shown in FIG. 2, for use with ceratin embodiments of the backrest mounting assembly, may include at least one elongated adjusting and securing member receiving slot to adjustably secure the backrest assembly to the backrest mounting assembly. The embodiment shown in FIG. 2 includes two such slots 9 and 11. The adjusting and securing member receiving slot(s) allow for the backrest assembly to be secured to the backrest mounting assembly in a variety of positions. The adjusting and securing member receiving slot(s) may receive an adjusting and securing member which may secure the backrest assembly to the backrest mounting assembly.

In alterative embodiments, a plurality of adjusting and securing member receiving passages 13 may be formed in the backrest assembly base member. The adjusting and securing member receiving passages may be formed in the backrest assembly base member in the same position as the adjusting and securing member receiving slot(s). As with the adjusting and securing member receiving slots 9 and 11, the backrest assembly base member may include a single row of adjusting and securing member receiving passages 13 or, as in the embodiment shown in FIG. 3, two rows of adjusting and securing member receiving passages.

Regardless of whether the backrest assembly base member includes adjusting and securing member receiving slot(s) or adjusting and securing member receiving passages, the backrest assembly base member may include more than two adjusting and securing member receiving slots or more than two rows of adjusting and securing member receiving passages. Preferably, if the backrest assembly base member includes adjusting and securing member receiving slots or rows of adjusting and securing member receiving passages to provide the most secure attachment of the backrest assembly to the backrest mounting assembly, the backrest assembly base member includes two slots or two rows of passages. This arrangement provides increased stability and less time and effort to produce than an embodiment including more slots or rows of passages.

Figure 3:
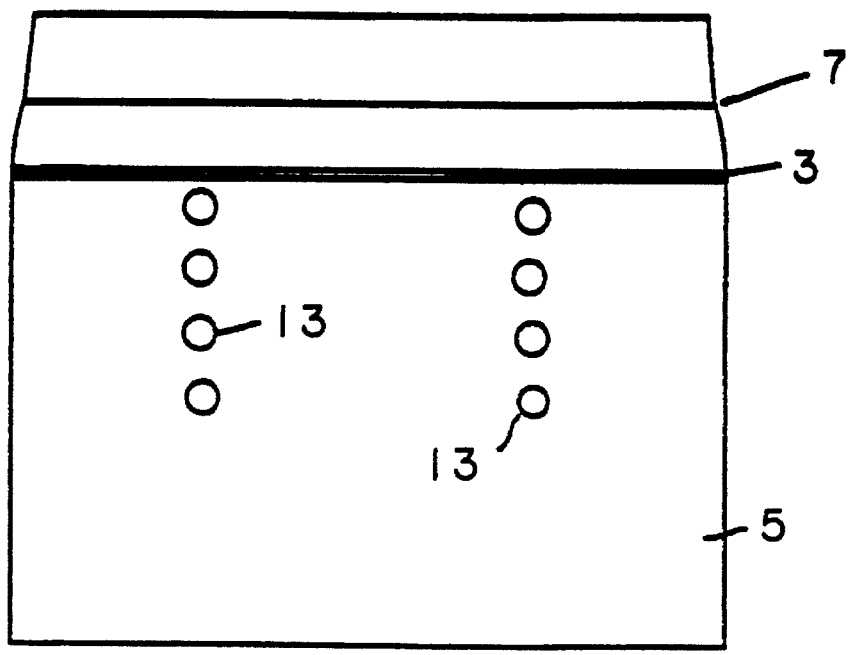
FIG. 3 represents an overhead view of another embodiment of a backrest assembly according to the present invention.
Figure 4:
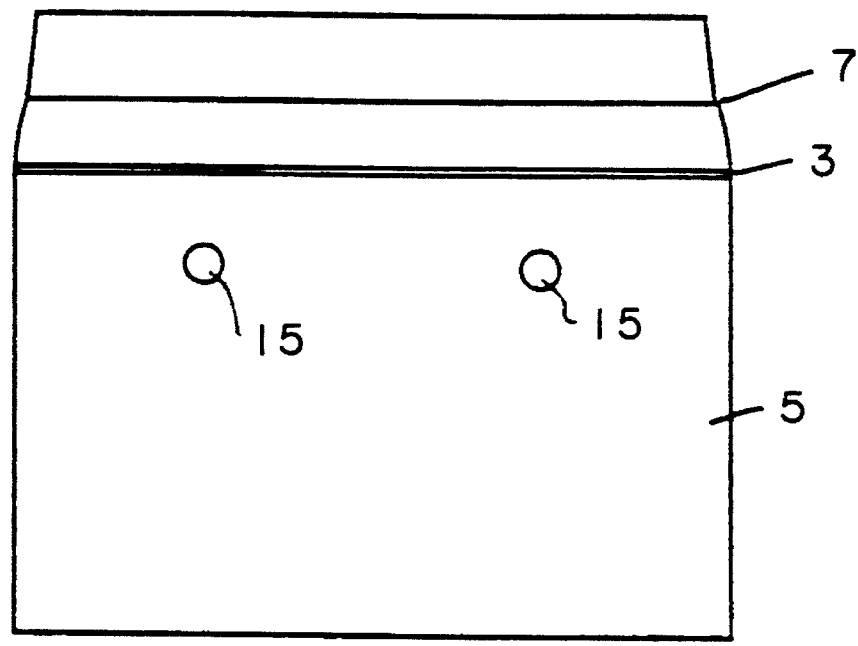
FIG. 4 represents an overhead view of a further embodiment of a backrest assembly according to the present invention.

In a still further embodiment, the present invention may include only two adjusting and securing member receiving passages 15 shown in FIG. 4. As with the adjusting and securing member receiving slots and the adjusting and securing member receiving passages shown in FIGS. 2 and 3, the adjusting and securing member receiving passages 15 shown in FIG. 4, may be provided singly or a plurality of such passages may be provided in the backrest assembly base member. Preferably, two adjusting and securing member receiving passages are included in the backrest assembly base member.

Embodiments of backrest assemblies including adjusting and securing member receiving passages or slots are designed to be mounted to backrest assemblies including components in addition to the at least one mounting strap described above. In particular, the backrest mounting assembly may include a backrest mounting assembly base member 17, shown in FIG. 5. The backrest mounting assembly base member 17 may include a planar member similar to the backrest assembly base member.

The shape and size of the backrest mounting assembly base member may vary and should be large enough to permit the secure mounting of the backrest assembly base member on the backrest mounting assembly base member and the mounting of the backrest mounting assembly on the motorcycle or other vehicle.

In order to accomplish the adjustable mounting of the backrest assembly base member on the backrest mounting assembly, the backrest mounting assembly base member may be provided with one or more adjusting and securing member receiving passages or an adjusting and securing member receiving slot formed therein. For example, a backrest mounting assembly base member to be used with a backrest assembly base member shown in FIG. 2 may include a pair of adjusting and securing member receiving passages similar to those shown in FIG. 4. A backrest mounting assembly base member to be used with a backrest assembly base member as shown in FIG. 3 may similarly include a pair of adjusting and securing member receiving passages similar to those shown in FIG. 4. A backrest mounting assembly base member to be used with a backrest assembly base member as shown in FIG. 4, could include either a pair of adjusting and receiving member receiving slots similar to those shown in FIG. 2. Alternatively, the backrest mounting assembly base member may include a plurality of adjusting and securing member receiving passages similar to those shown in FIG. 3.

As can be seen from the drawings and from the above description, for the backrest to be adjustable, either the backrest assembly base member or the backrest mounting assembly preferably is provided with a plurality of possible mounting and securing locations. However, the backrest may also be made to order to fit a specific individual and, therefore, may not be adjustable. In such a case, neither the backrest assembly nor the backrest mounting assembly would be required to include provisions for mounting the backrest assembly and the backrest mounting assembly in different positions relative to each other. In such an embodiment, the backrest assembly and the backrest mounting assembly could be joined as one integral body which would be then be mounted to the motorcycle, scooter, or moped.

Figure 5:
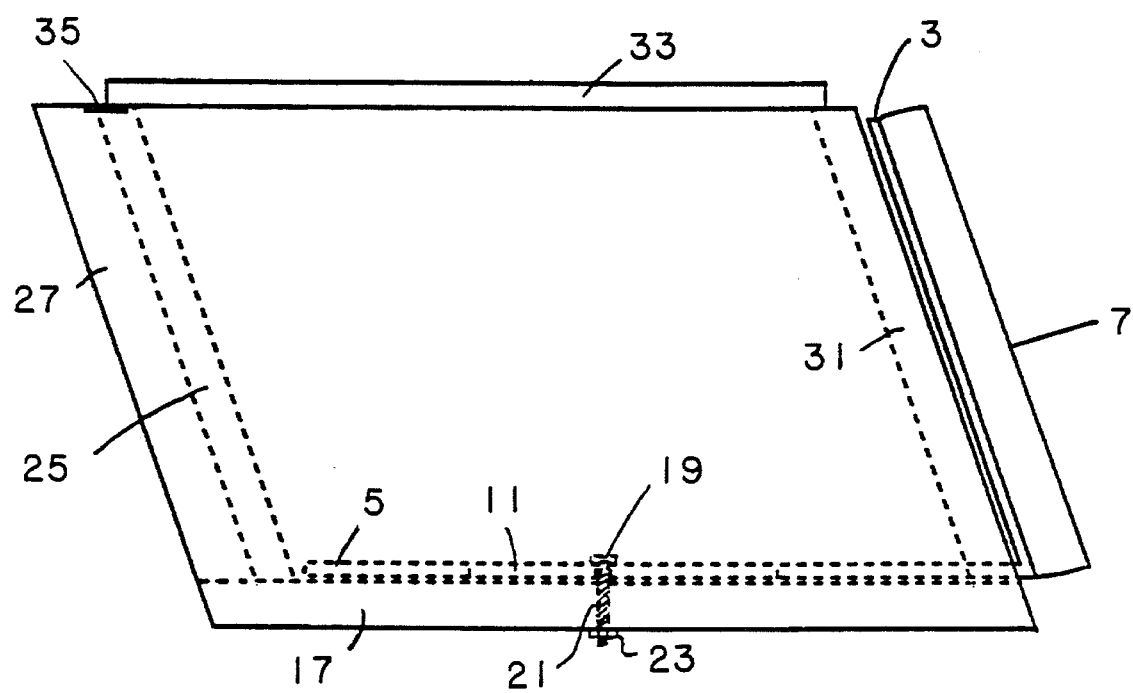
FIG. 5 represents a cross-sectional view of one embodiment of the present invention including a backrest assembly, a backrest mounting assembly, and a storage compartment.

In embodiments of the present invention which include adjusting and securing member receiving slots or passages, the backrest assembly and the backrest mounting assembly may be secured with a bolt or similar securing member, which, as shown in FIG. 5, passes, for example, through the adjusting and securing member receiving slot 11 and the backrest assembly base member and, as in the embodiment shown in FIG. 5, through an adjusting and securing member receiving passage 21 formed in the backrest mounting assembly base member. If a bolt is used to secure the backrest assembly to the backrest mounting assembly, the bolt may be secured in place with a nut 23 attached to the end. Preferably the nut 23 is screwed onto the bolt tightly enough secure the backrest assembly in place in the desired position. A screw, nail, pin, or other similar element may be used in place of a bolt. For instance, a pin having a flared ridge formed about its perimeter could be inserted into the adjusting and securing member receiving passage(s) and/or slot(s) which may also include a ridge. The ridge of the pin and the passage(s) and/or slot(s) would be forced past each other, thereby preventing the pin from easily escaping from the passage(s) and/or slot(s). A spring-loaded pin could also be used in which a pin is normally forced into the slot(s) and/or passage(s) and to which force can be applied to pull or push the pin out of the hole. An assembly similar to that used to adjust automobile seats could even be used.

The adjustability of the backrest assembly relative to the backrest mounting assembly could also be provided by reversing the location of the adjusting and securing member receiving slot 11 and the adjusting and securing member receiving passage 23, thereby providing an adjusting and securing member receiving passage in the backrest assembly base member as shown in FIG. 4 and an adjusting and securing member receiving slot in the backrest mounting assembly base member 17. Additionally, the slot in either the backrest assembly base member or backrest mounting assembly base member could be replaced with a plurality of adjusting and securing member receiving passages similar to those shown in FIG. 3.

As stated above, although the adjusting and securing member 19 shown in FIG. 5 is a bolt, other fasteners may be used for securing the backrest assembly and the backrest mounting assembly together. For instance, a screw could be used or a nail or any other type of fastening device which would substantially immobilize the backrest assembly and the backrest mounting assembly relative to each other. Additionally, the embodiment shown in FIG. 5 may also include one or more additional adjusting and securing inserted through one or more additional adjusting and securing member receiving slots and/or adjusting and securing member receiving passages formed in the backrest assembly base member and the backrest mounting assembly base member.

The backrest mounting assembly may also include at least one mounting strap to secure the backrest mounting assembly to the motorcycle or other vehicle. The securing strap(s) may be, for example, riveted to the backrest mounting assembly base member. Other means may also be used to secure the strap(s) to the backrest assembly base member.

After securing the backrest assembly to the backrest mounting assembly base member, the backrest mounting assembly may be secured to the motorcycle or other vehicle. To attach the backrest mounting assembly, the backrest mounting assembly base member may be placed upon the passenger seat. At least one securing strap attached to the backrest mounting assembly base member may then be used to secure the backrest mounting assembly to the motorcycle or other vehicle. To secure the backrest mounting assembly, the at least one strap may be wrapped about the seat of a motorcycle or other vehicle.

The backrest mounting assembly may also include a backrest mounting assembly rear member 25 extending upwardly from the backrest mounting assembly base member. The backrest mounting assembly rear member 25 may provide further structure to secure and stabilize the backrest on the motorcycle or other vehicle. For instance, the backrest mounting assembly may be made long enough so that the backrest mounting assembly rear member may engage the existing sissy bar or backrest on the motorcycle or other vehicle.

Preferably, the backrest mounting assembly rear member 25 extends at an angle from the backrest mounting assembly base member 17. The angle at which the rear member 25 extends from the base member 17 preferably is such that if the base member 17 is resting upon the passenger seat of a motorcycle, scooter, or moped, the rear member 25 will be parallel to the surface of the backrest or sissy bar extending up from the rear of the passenger seat. In one embodiment, the angle between the backrest assembly base member and the backrest assembly rear member is about 110°.

The backrest mounting assembly, including the base member 17 and the rear member 25, may be mounted to the motorcycle, scooter, or moped using straps or clamps or other mounting means. For example, at least one mounting strap may be attached to the backrest assembly rear member 25 in addition to or instead of the backrest assembly base member. The mounting straps may be attached to the rear member 25 using rivets, adhesive, screws, or any other suitable means.

The mounting strap(s) attached to the rear member 25 may be wrapped about the sissy bar or backrest. In one embodiment, a mounting strap is attached to each side of the rear member. One strap may include a clasp, buckle or other similar means to engage the other strap. Preferably, the buckle, clasp, or other means allows the straps to be adjusted to tightly secure the backrest mounting assembly to the motorcycle or other vehicle. Once the backrest mounting assembly is secured to the vehicle, the backrest assembly may be adjusted to the optimum position for the driver's comfort.

The backrest mounting assembly may also comprise backrest mounting assembly side members 27 and 29. The backrest mounting assembly side members 27 and 29 may be joined to opposite sides of the backrest mounting assembly base member 17 and the backrest mounting assembly rear member 25. The side member may provide further stability to the backrest mounting assembly.

Figure 6:
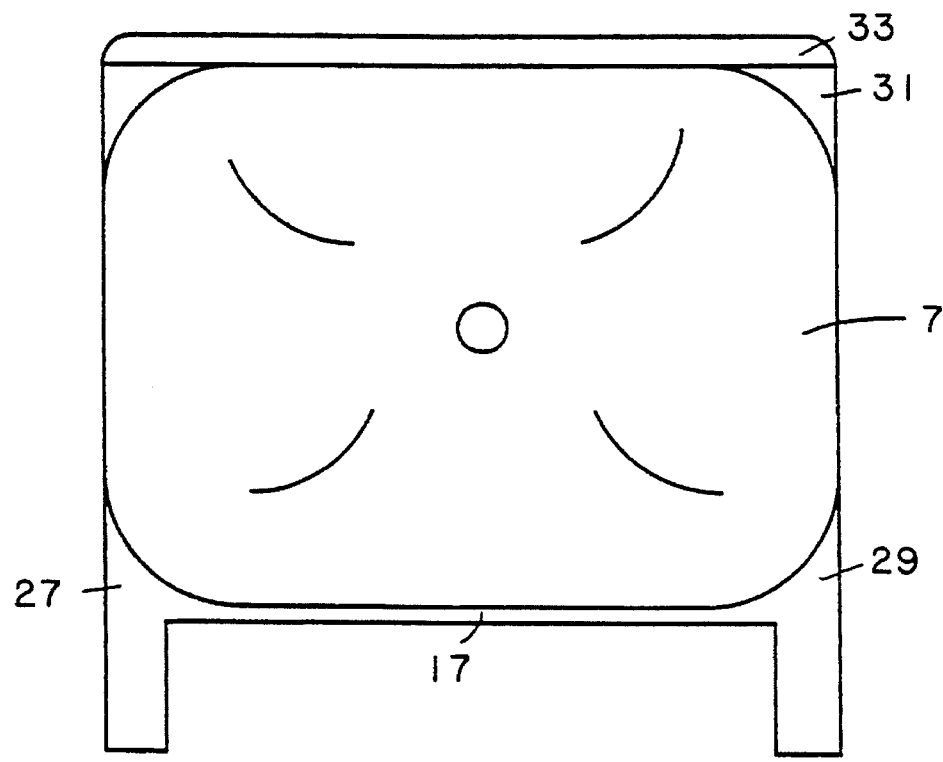
FIG. 6 represents a front view of an embodiment of the present invention including a backrest assembly, a backrest mounting assembly and a storage compartment.

In some embodiments, the side members 27 and 29 may extend below the backrest mounting assembly base member 17 as shown in FIG. 6. By providing extensions to the side members, when the backrest mounting assembly is placed upon the passenger seat of a motorcycle, scooter, moped, or other vehicle, the extensions of the side members 27 and 29 may engage the sides of the passenger seat of vehicle, thereby providing side-to-side stability for the backrest mounting assembly and, therefore, the backrest assembly. If the backrest mounting assembly starts to shift to one side, one of the side members will engage the side of the motorcycle, scooter, or moped seat, thereby preventing the backrest mounting assembly from traveling a large distance.

In an embodiment as described above in which the side members extend below the level of the backrest mounting assembly base member 17, the backrest mounting assembly base member 17 preferably is approximately as wide as the passenger seat of the motorcycle, scooter, or moped upon which the backrest mounting assembly is attached. By making the backrest mounting assembly base member this width, it is ensured that the side members will be able to extend down next to the side of the passenger seat on which the backrest is mounted and also that the extensions of the side members will closely engage the sides of the seat. In the present invention, the side members 27 and 29 may instead or also extend beyond the rearmost edge of the backrest mounting assembly rear member 25. This may be seen both in FIGS. 5 and 7.

In the embodiment described above in which the backrest mounting assembly side members extend beyond the backrest mounting assembly rear member, the rear member preferably is approximately as wide as the backrest or sissy bar attached to the motorcycle, scooter, or moped upon which the backrest is mounted. In this manner, it can be ensured that the side members will closely engage the sides of the backrest or sissy bar. In this manner, the side-to-side movement of the backrest and backrest mounting assembly can be further prevented.

The backrest mounting assembly side members may extend either below the level of the backrest mounting assembly base member, rearwardly of the backrest mounting assembly rear member 25, or both. In some embodiments, the backrest mounting assembly side members may comprise only portions extending below the backrest mounting assembly base member and rearwardly of the backrest mounting assembly rear member, but not above the backrest mounting assembly base member or forward of the backrest mounting assembly rear member. The backrest mounting assembly side members may instead or also extend upwardly from the backrest mounting assembly base member and forwardly from the backrest mounting assembly rear member.

Embodiments of the present invention which include backrest mounting assembly side members may also comprise a storage compartment. The storage compartment preferably is defined, in part by the backrest mounting assembly base member 17, the backrest mounting assembly rear member 25, and the backrest mounting assembly side members 27 and 29. The other side of the compartment may be provided by a backrest mounting assembly front member 29 attached near the front edges of the backrest mounting assembly side members 27 and 29 and near the front edge of the backrest mounting assembly base member 17. Preferably, the backrest mounting assembly front member 31 is joined to the side members and the base member at an angle such that it will be parallel to the backrest member 3.

The backrest mounting assembly front member 31 may be attached anywhere along the upper surface of the backrest mounting assembly base member 17. To provide a storage compartment with greater capacity, the backrest mounting assembly front member 31 may be attached near the front end of the backrest mounting assembly base member 17 and be as tall as the backrest mounting assembly rear member 25. Further, the backrest mounting assembly side members 27 and 29 may extend from the backrest mounting assembly base member 17 to the level of the top or above the top of the backrest mounting assembly rear member 25. The side members 27 and 29 may also extend from the backrest mounting assembly rear member 25 forward to the forward-most edge of the backrest mounting assembly base member 17. However, the members of the backrest mounting assembly and storage compartment may be of any desired size.

In some embodiments, the storage compartment may be closed with a storage compartment cover 33. Preferably, the storage compartment cover 33 is articulately joined to the backrest assembly rear member, one of the side members, or the backrest mounting assembly front member. The storage compartment cover may be joined to one of these members using hinges or any other type of fastener which will allow the cover to be opened and closed, thereby providing access to the interior of the storage compartment. For example, the storage compartment cover may slide in grooves formed in the upper portions of the backrest mounting assembly side members and/or front and rear members. Alternatively, one or more flexible members, such as a piece of nylon or leather may be attached the storage compartment cover and one of the side members, rear member, or front member of the backrest assembly or storage compartment.

FIG. 6 shows a front view of a removable, adjustable backrest for a motorcycle, scooter, moped, or other vehicle according to one embodiment of the present invention. The embodiment shown in FIG. 6 includes backrest mounting assembly side members 27 and 29 which extend downwardly below the level of the backrest assembly base member 17. The embodiment also includes a storage compartment, the front member 31 of which is visible in FIG. 6. The storage compartment also includes a storage compartment cover 33. The backrest member of the embodiment shown in FIG. 6 includes a foam padded backrest 7 covered with a leather or vinyl cover.

Figure 7:
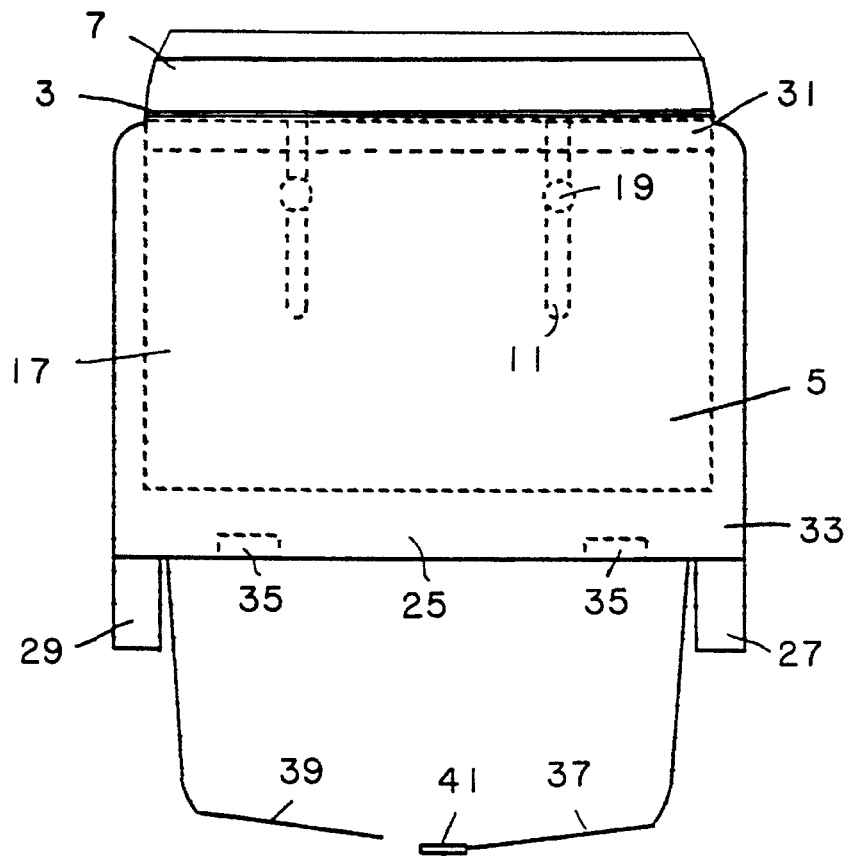
FIG. 7 represents an overhead view of an embodiment of the present invention including a backrest assembly, a backrest mounting assembly, and a storage compartment and two mounting straps.

FIG. 7 shows an overhead view of an embodiment of the present invention including a backrest assembly and a backrest mounting assembly which includes a storage compartment. The backrest assembly includes a backrest member 3 and a backrest assembly base member 5. A foam padded cushion is attached to the backrest member 3. The backrest assembly base member is provided with a pair of adjusting and securing member receiving passages.

The backrest mounting assembly of the embodiment shown in FIG. 7 includes two backrest mounting assembly side members 27 and 29, a backrest mounting assembly rear member 33, and a backrest mounting assembly base member 17. The backrest mounting assembly base member 17 is provided with a pair of adjusting and securing member receiving slots 11 formed therein for receiving an adjusting and securing member 19. The adjusting and securing member preferably is inserted through an adjusting and securing member receiving passage 15 formed in the backrest assembly base member 5 and extends through one of the adjusting and securing member receiving slots 11 formed in the backrest mounting assembly base member.

The adjusting and securing member may be secured from within the storage compartment. In such an embodiment, the adjusting and securing member may be a bolt. The bolt may be inserted into the adjusting and securing member receiving slots and/or passages and then secured in place with a nut attached to the bolt from within the storage compartment. Alternatively, the nut could be attached from the underside of the backrest mounting assembly base member. However, in such an embodiment, the backrest would need to be removed from the vehicle to accomplish the adjustment of the backrest assembly.

The embodiment shown in FIG. 7 also includes a storage compartment formed by the backrest mounting assembly base member 17, the backrest mounting assembly side members 27 and 29, the backrest mounting assembly rear member 25, and a backrest mounting assembly front member 31 attached to the side members and the base member. The storage compartment also includes a storage compartment cover 33 attached to the storage compartment rear member 27 with a pair of hinges 35. As can be seen in FIG. 7, the backrest mounting assembly side members may extend rearwardly beyond the rear edge of the backrest mounting assembly side members and the backrest mounting assembly rear member.

The embodiment shown in FIG. 7 is secured to the motorcycle, scooter, or moped using a pair of straps 37 and 39 which are attached together with a fastener 41. The fastener used to secure the straps together may be a buckle or clasp or some other type of fastener for joining two straps. Any type of known clasp such as is used on straps attached to car roof racks, a type used to secure ropes or straps on boats, or a clasp as is often used on belt buckles or any other such known type of clasp may be used with the invention. The straps could also be tied together or joined using other means for fastening two straps. Additionally, more straps could be added to the backrest to further secure the backrest to the vehicle.

The straps 37 and 39 may be secured to the backrest mounting assembly using glue or screws or nails or any other type of fastener which may be used to secure such straps to the backrest mounting assembly. Alternatively, or in addition, the straps may be sandwiched between the backrest assembly rear member 25 and the side members 27 and 29 or between the backrest assembly rear member 25 and the backrest assembly base member 17. The mounting straps are used to help secure the backrest to the motorcycle, scooter, or moped. The straps or other securing members may be mounted on the backrest at any location so as to allow the backrest to be secured to the vehicle.

To secure the backrest mounting assembly, the straps may be wrapped about the backrest or sissy bar on the motorcycle, scooter, or moped and then tightly secured in place with the clasp 41. These straps may instead or also be wrapped around any other part of the structure of the motorcycle, scooter, or moped so as to secure the mounting assembly on the vehicle.

Figure 8:
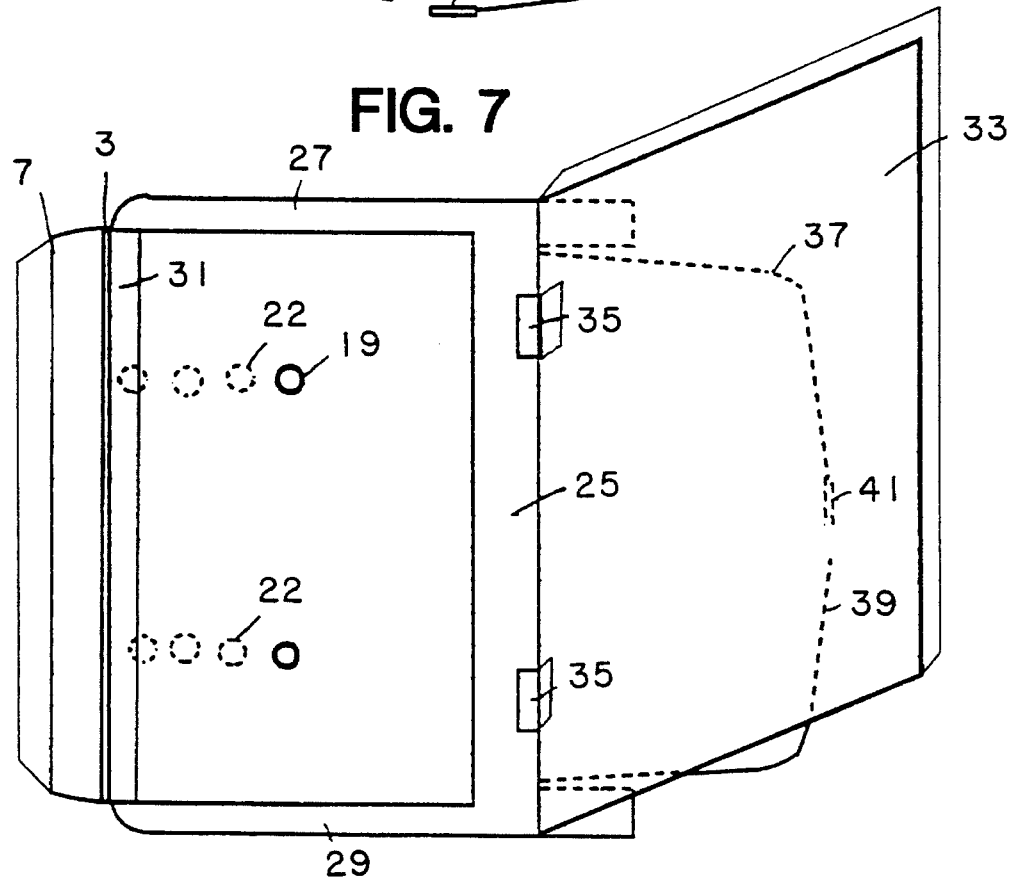
FIG. 8 represents an overhead view of another embodiment of the present invention including a backrest assembly, a backrest mounting assembly and a storage compartment.

The embodiment shown in FIG. 8 is similar to the embodiment shown in FIG. 7. However, unlike the embodiment shown in FIG. 7, the backrest assembly base member 17 includes a plurality of adjusting and securing member receiving passages 22 formed therein rather than the adjusting and securing member receiving slot 11 shown in FIG. 7. In the embodiment shown in FIG. 8, the storage compartment cover 33 is shown in an open position in which the interior of the storage compartment may be seen.

Figure 9:
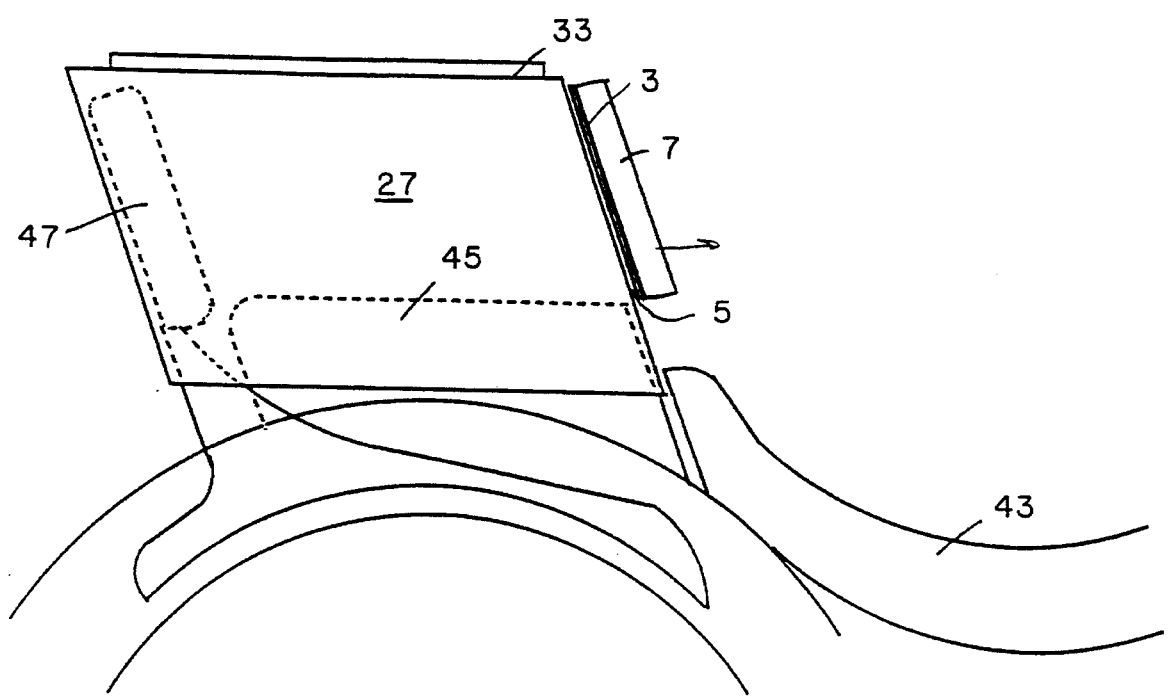
FIG. 9, represents a side view of an embodiment of the present invention mounted on a motorcycle.

FIG. 9 shows an embodiment of the present invention mounted on a motorcycle. The motorcycle includes a driver's seat 43, a passenger seat 45, and a backrest or sissy bar 47. The backrest mounting assembly in the embodiment shown in FIG. 9 includes a backrest mounting assembly base member, a backrest mounting assembly rear member, and two backrest mounting assembly side members.

The embodiment shown in FIG. 9 includes backrest mounting assembly side members, one of which 27 is shown in FIG. 9, which extend downwardly below the lower surface of the backrest mounting assembly base member and rearwardly beyond rear surface of the backrest mounting assembly rear member so as to engage both the passenger seat 45 and the sissy bar or backrest 47. The embodiment shown in FIG. 9 also includes storage compartment formed by the members of the backrest mounting assembly and a backrest mounting assembly front member. The storage compartment is covered by a storage compartment cover 33.

Figure 10:
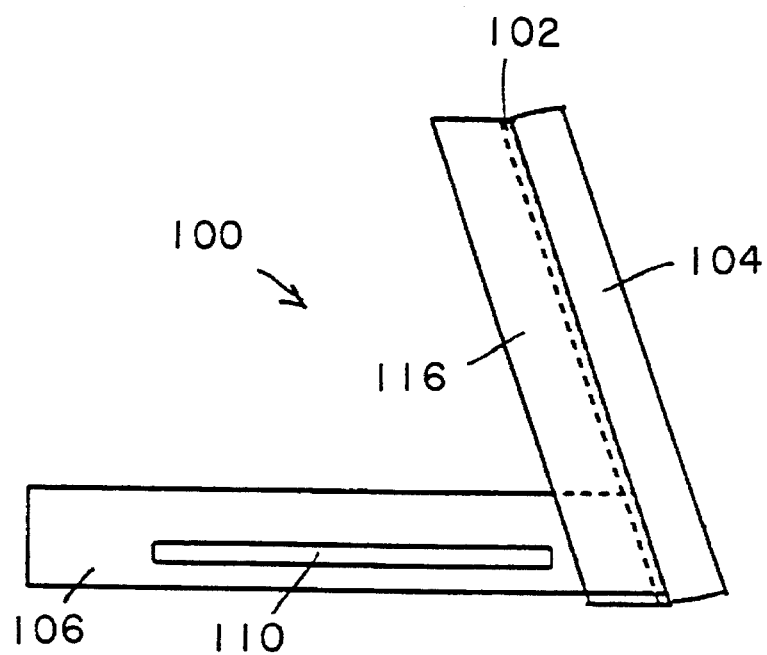
FIG. 10 represents another embodiment of a backrest assembly according to the present invention.

In an alternative embodiment of the present invention, shown in FIG. 10, the backrest assembly 100 includes a backrest member 102 which may have a cushion 104 attached to it. The cushion may be similar to the cushion described above, both in design and construction.

Figure 11:
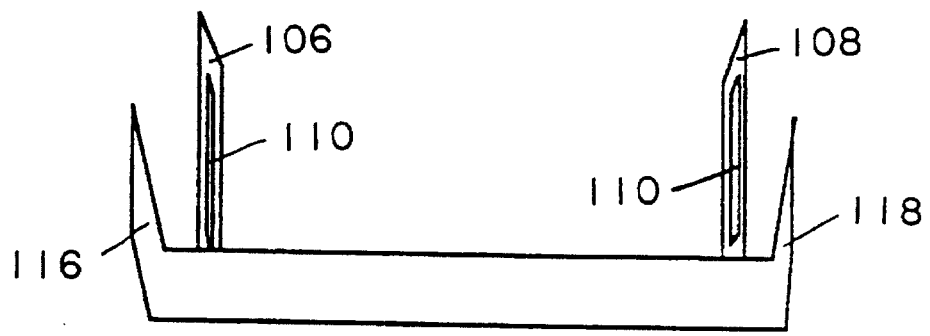
FIG. 11 represent an overhead perspective view of the embodiment shown in FIG. 10.

Unlike the embodiments described above, in the embodiment shown in FIG. 10, extending rearwardly from the backrest member 102 are a pair of backrest assembly base members 106 and 108 as shown in FIG. 11. The backrest assembly base members 106 and 108 serve much the same function as the backrest assembly base member 5 in the embodiment shown in FIGS. 1–9. Therefore, the backrest assembly base members 106 and 108 help to secure the backrest assembly in position on the backrest mounting assembly. Additionally, the backrest assembly base members preferably also include structure to allow the backrest assembly to be adjustably mounted in place.

The backrest mounting assembly base members 106 and 108 preferably are secured to the backrest member. In an embodiment in which the backrest member 102 and the backrest assembly base members 106 and 108 are made of metal, the backrest assembly base members and backrest member 102 may be welded together. In other embodiments in which the components of the backrest assembly are made of plastic, the components may be formed as a single unitary member. Alternatively, adhesive may be used to secure the components of the backrest assembly together. Further, screws, nails, or other securing members may also be used to secure together the backrest member 102 and the backrest assembly base members 106 and 108. For instance, if the backrest member 102 and backrest assembly base members 106 and 108 are made of wood, nails or screws could be used to secure the components of the backrest assembly together.

Figure 12:
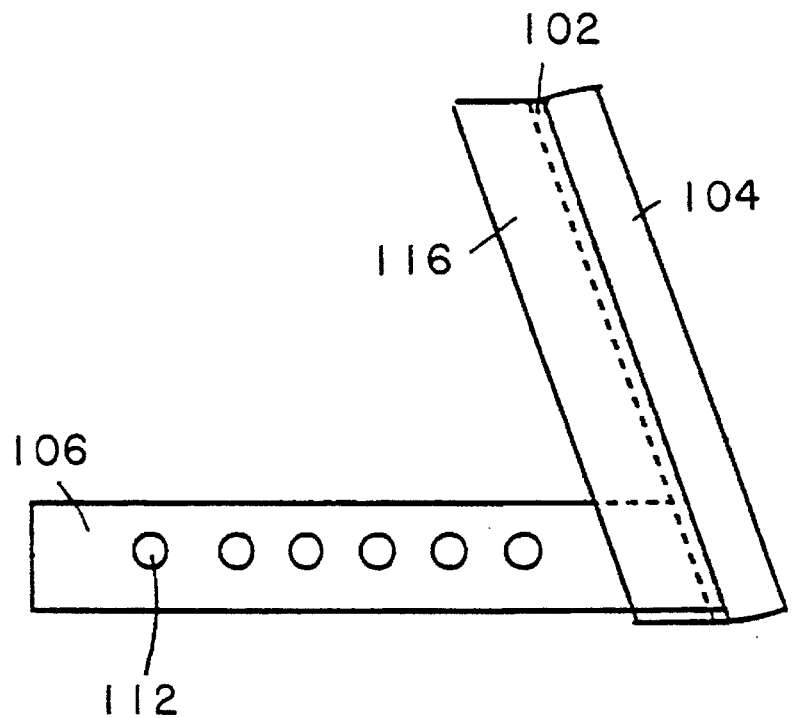
FIG. 12 represents another embodiment of a backrest assembly according to the present invention.

As stated above, the base members 106 and 108 serve much the same purpose and function as the base member 5 in the embodiments shown in FIGS. 1–9. Accordingly, the backrest assembly base member helps to secure the backrest assembly to the backrest mounting assembly. Therefore, the backrest assembly base members preferably include a structure to allow the backrest assembly to be adjusted. In the embodiment shown in FIG. 10, the backrest assembly base members 106 and 108 include an adjusting and securing member receiving slot 110 for receiving an adjusting and securing member. The backrest assembly base members 106 and 108 may also include a plurality of adjusting and securing member receiving passages 112 as shown in FIG. 12 or a single adjusting and securing member receiving passage 114 shown in FIG. 13. As described above regarding the embodiments shown in FIGS. 1–9, the form of the passage for receiving the adjusting and securing member in the backrest assembly base member is interdependent with the form of the passage for receiving new adjusting and securing member included in the backrest mounting assembly.

The embodiment of the backrest assembly shown in FIGS. 10–13 may also include a pair of backrest assembly side members 116 and 118. The backrest assembly side member 116 and 118 may engage the sides of the backrest mounting assembly as described in detail below. By engaging the sides of the backrest mounting assembly, the backrest assembly side members 116 and 118 may help to provide greater stability to the backrest assembly. The backrest assembly side members may be joined to the backrest member in a manner similar to the backrest assembly base members, as described above. In an embodiment of the invention including backrest assembly side members, the cushion may extend from the front of the backrest member around to the backrest assembly side members.

A backrest mounting assembly for use with a backrest assembly as shown in FIGS. 10–13, preferably includes at least two backrest assembly side members 120 and 122 joined by a backrest assembly base member 124. In this embodiment, the side members of the backrest mounting assembly extend upwardly from the base member 124 at least far enough to permit one or more adjusting and securing member receiving passages or slots to be formed therein to allow the backrest assembly to be secured to the backrest mounting assembly. Backrest mounting assembly side members designed to be used with an embodiment of the backrest assembly as shown in FIG. 10, preferably include a single adjusting and securing member receiving passage (not shown) through which an adjusting and securing member 126 extends.

The adjusting and securing member may also extend through the adjusting and securing member receiving slot 110 formed in the backrest assembly base member 106. The adjusting and securing member may then secured in place so as to substantially immobilize the backrest assembly base member 106 with respect to the backrest assembly side member 120. The other backrest assembly side member 108 and backrest mounting assembly side member 122 may also be similarly provided with adjusting and securing member receiving passages and/or slots and may be similarly secured.

The adjusting and securing member receiving slot 128 may be included in the backrest mounting assembly side member 120 rather than in the backrest assembly side member 106 as shown in FIG. 114. In this embodiment, the backrest assembly side member includes a single adjusting and securing member as in the embodiment shown in FIG. 13.

Figure 13:
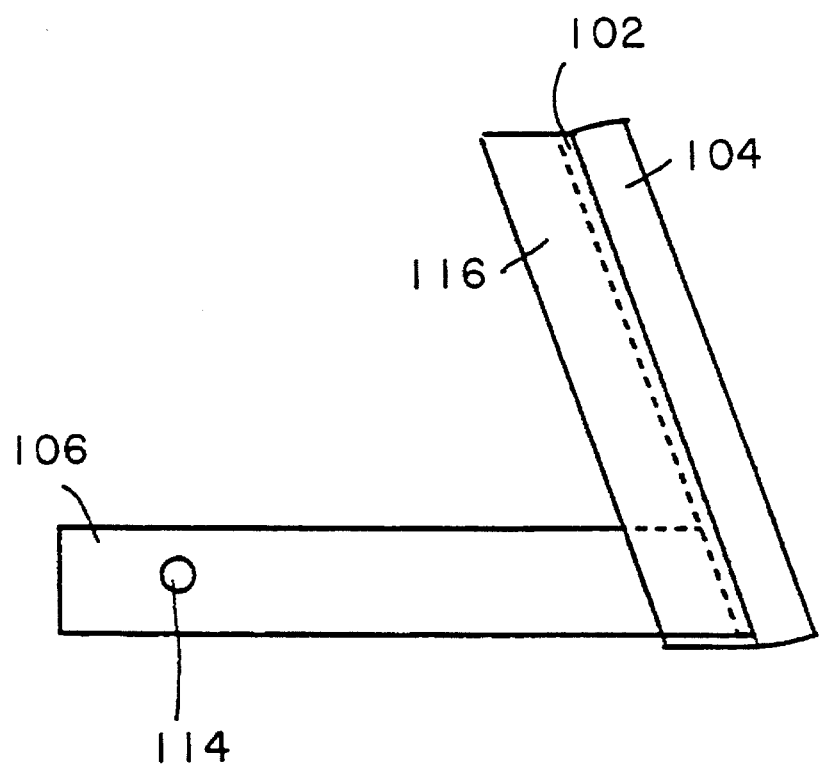
FIG. 13 represents a further embodiment of a backrest assembly according to the present invention.

An adjusting and securing member receiving slot in either the backrest assembly base members or the backrest mounting assembly side members may be replaced with a plurality of adjusting and securing member receiving passages similar to those shown in FIG. 12. If one of the backrest mounting assembly side members or backrest assembly base members includes a plurality of adjusting and securing member receiving passages as shown in FIG. 12, the other is provided with a single adjusting and securing member receiving passage as shown in FIG. 13. The provision of the adjusting and securing member receiving slots and/or passages may be varied preferably as long as the backrest assembly is adjustable. The length of the adjusting and securing member receiving passages/slots may be varied to provide a desire degree of adjustability. The backrest assembly and the backrest mounting assembly may be secured together with a bolt, pin, screw, nail, or any other suitable member substantially as described above for the embodiments shown in FIGS. 1–9.

A backrest mounting assembly which includes a backrest mounting assembly base member and two backrest assembly side members may be secured to the motorcycle, scooter, or moped with one or more securing straps. The straps may be secured to the backrest mounting assembly as described above for the straps which may secure the embodiment shown in FIGS. 1–9. As also discussed above, the number of straps may be varied depending upon the requirements of the embodiment.

Figure 15:
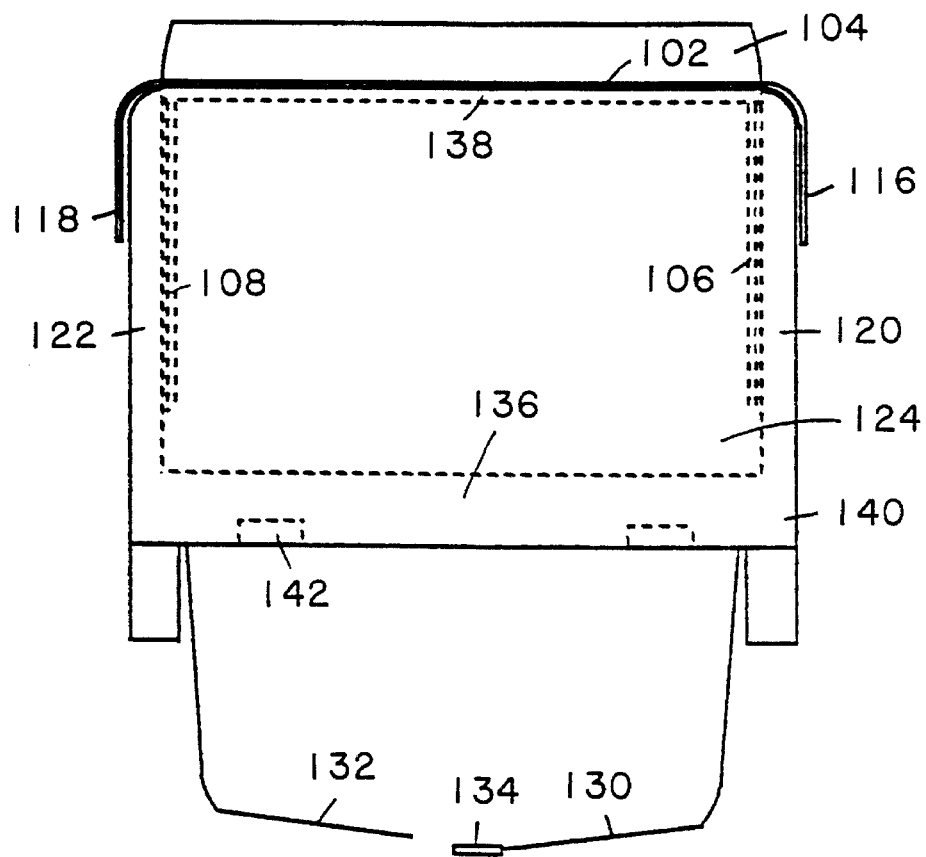
FIG. 15 represents an overhead view of the embodiment of the present invention shown in FIG. 14 including two mounting straps.

The embodiment shown in FIG. 15 includes two mounting straps 130 and 132. The mounting straps may be secured together using a clasp 134. A clasp 134 may be similar to the clasp 41 used in the embodiments shown in FIGS. 7 and 8. As described in detail above, the clasp(s) used may vary. Further, the straps may also be tied together or secured in any other suitable manner. The mounting straps may be used to secure the backrest mounting assembly to the backrest or sissy bar or any other part of the motorcycle, scooter, or moped. The straps may be secured about any part of the vehicle as long as the backrest is secure.

To assist in mounting the backrest mounting assembly on the motorcycle, scooter, or moped and to help insure the stability of the backrest mounting assembly thereon, the backrest mounting assembly side members 120 and 122 may extend downwardly below the bottom surface of the backrest mounting assembly base member 124. In such an embodiment, the base member 124 preferably is about as wide as the passenger seat of the motorcycle, scooter, or moped upon which the backrest is being mounted. Also in such an embodiment, the inner sides of the side members 120 and 122 preferably engage the side of the seat member thereby helping to provide side to side stability for the backrest mounting assembly.

The backrest mounting assembly side members 120 and 122 may instead or also extend rearwardly beyond the rear most edge of the backrest assembly base member 124 so as to engage the backrest or sissy bar on a motorcycle, scooter, or moped when the backrest mounting assembly is place on the passenger seat.

In some embodiments, the side members 120 and 122 may extend below the backrest mounting assembly base member 124. By providing extensions to the side members, when the backrest mounting assembly is placed upon the passenger seat of a motorcycle, scooter, moped, or other vehicle, the extensions of the side members 120 and 122 may engage the sides of the passenger seat of a motorcycle, or moped, thereby providing side-to-side stability for the backrest mounting assembly and therefore the backrest assembly. If the backrest mounting assembly starts to shift to one side, one of the side members will engage the side of the motorcycle, scooter, or moped seat, thereby preventing the backrest mounting assembly from traveling a large distance.

In an embodiment as described above in which the side members 120 and 122 extend below the level of the backrest mounting assembly base member 124, the backrest mounting assembly base member 124 preferably is approximately as wide as the passenger seat of the motorcycle, scooter, or moped upon which the backrest mounting assembly is attached. By making the backrest mounting assembly base member this width, it is ensured that the side members will be able to extend down next to the side of the passenger seat on which the backrest is mounted and also that the extensions of the side members will closely engage the sides of the seat.

In the present invention, the side members 120 and 122 may instead or also extend beyond the rearmost edge of the backrest mounting assembly rear member 136. This may be seen both in FIGS. 14–16. In the embodiment described above in which the backrest mounting assembly side members 120 and 122 extend beyond the backrest mounting assembly rear member 136, the rear member preferably is approximately as wide as the backrest or sissy bar attached to the motorcycle, scooter, or moped upon which the backrest is mounted. In this manner, it can be ensured that the side members 120 and 122 will closely engage the sides of the backrest or sissy bar. Additionally, the side-to-side movement of the backrest and backrest mounting assembly can be further prevented.

The backrest mounting assembly side members may extend either below the level of the backrest mounting assembly base member, or rearwardly of the backrest mounting assembly rear member 136 or both. In some embodiments, the backrest mounting assembly side members may comprise only portions extending below the backrest mounting assembly base member and rearwardly of the backrest mounting assembly rear member, but not above the backrest mounting assembly base member or forward of the backrest mounting assembly rear member.

The backrest mounting assembly side members may instead or also extend upwardly from the backrest mounting assembly base member and forwardly from the backrest mounting assembly rear member.

The backrest mounting assembly may also include a backrest mounting assembly rear member 136. The backrest mounting assembly rear member preferably is joined to the backrest mounting assembly base member 124 the backrest mounting assembly side members 120 and 122 near the rear of the side members. The backrest mounting assembly rear member may provide further structure to secure and stabilize the backrest on the vehicle. The backrest mounting assembly rear member 136 may engage the surface of the backrest member or sissy bar on the motorcycle, scooter, moped, or other vehicle.

Preferably, the backrest mounting assembly rear member 136 extends at an angle from the backrest mounting assembly base member 124. The angle at which the rear member 136 extends from the base member 124 preferably is such that if the base member 124 is resting upon the passenger seat of a motorcycle, scooter, or moped, the rear member 136 will be parallel to the surface of the backrest or sissy bar extending up from the rear of the passenger seat. In one embodiment, the angle between the backrest assembly base member and the backrest assembly rear member is about 110°.

In some embodiments, the backrest mounting assembly may also comprise a storage compartment as described above for the embodiments shown in FIGS. 5–9. The storage compartment is formed by the backrest mounting assembly side members, rear member and base member. The storage compartment preferably is also formed by a backrest mounting assembly front member 138. The front member 138 may be attached near the front edges of the backrest mounting assembly side members 120 and 122. Preferably, the front member 138 is attached to the side members at the same angle as the angle between the backrest member and the backrest assembly base member so as to be parallel to the backrest member. In addition to forming a wall of the storage compartment, the front member 138 may also provide additional stability to the backrest mounting assembly.

The backrest mounting assembly front member 138 may be attached anywhere along the upper surface of the backrest mounting assembly base member 124. To provide a storage compartment with greater capacity, the backrest mounting assembly front member 138 may be attached near the front end of the backrest mounting assembly base member 124 and be as tall as the backrest mounting assembly rear member 136. Further, the backrest mounting assembly side members 120 and 122 may extend from the backrest mounting assembly base member 124 to the level of the top or above the top of the backrest mounting assembly rear member 136. The side members 120 and 122 may also extend from the backrest mounting assembly rear member 136 forward to the forward-most edge of the backrest mounting assembly base member 124. However, the members of the backrest mounting assembly and storage compartment may be of any desired size.

In an embodiment including a storage compartment, the backrest assembly base members 106 and 108 may extend in slots formed in a backrest mounting assembly front member 138. Alternatively, the backrest assembly base members 106 and 108 may extend between the backrest mounting assembly front member and the backrest mounting assembly side members 120 and 122.

Figure 16:
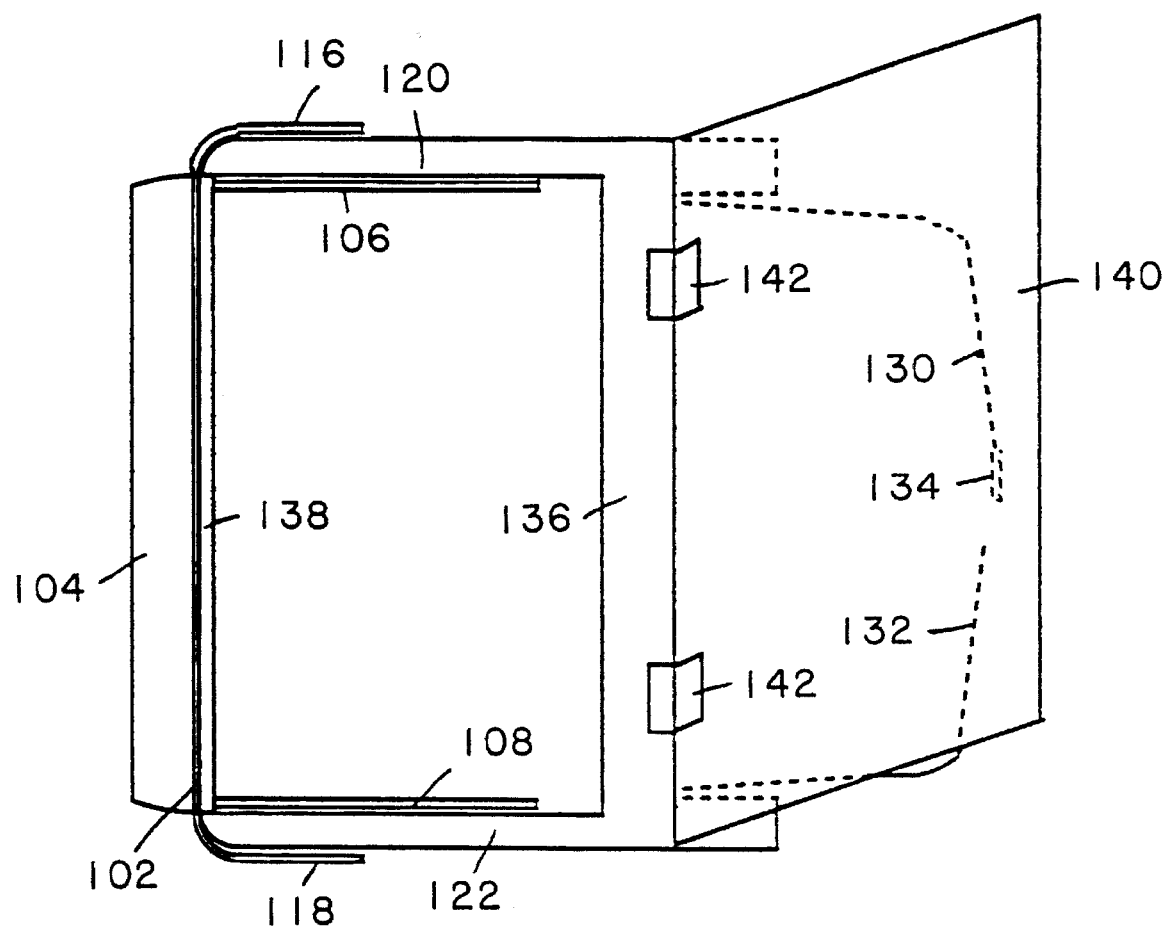
FIG. 16 represents another view of the embodiment shown in FIG. 15.

The storage compartment may also include a storage compartment cover 140 articulately mounted to the backrest mounting assembly rear member 136, one of the backrest mounting assembly side members 120 and 122 or the backrest mounting assembly front member 138. Preferably, the storage compartment cover 140 is articulately joined to the backrest assembly rear member, one of the side members, or the backrest mounting assembly front member. In the embodiment shown in FIGS. 14–16, the storage compartment cover 140 is mounted using a pair of hinges 142 to the backrest mounting assembly rear member 136. FIG. 16 shows the embodiment shown in FIG. 15 with the storage compartment cover in an open position.

The storage compartment cover may be joined to one of the backrest mounting assembly side, rear, or front members using hinges or any other type of fastener which will allow the cover to be open and closed thereby providing access to the interior of the storage compartment. For example, the storage compartment cover may slide in grooves formed in the upper portions of the backrest mounting assembly side members and/or front and rear members. Alternatively, one or more flexible members, such as a piece of nylon or leather may be attached the storage compartment cover and one of the side members, rear member, or front member of the backrest assembly or storage compartment.

Figure 14:
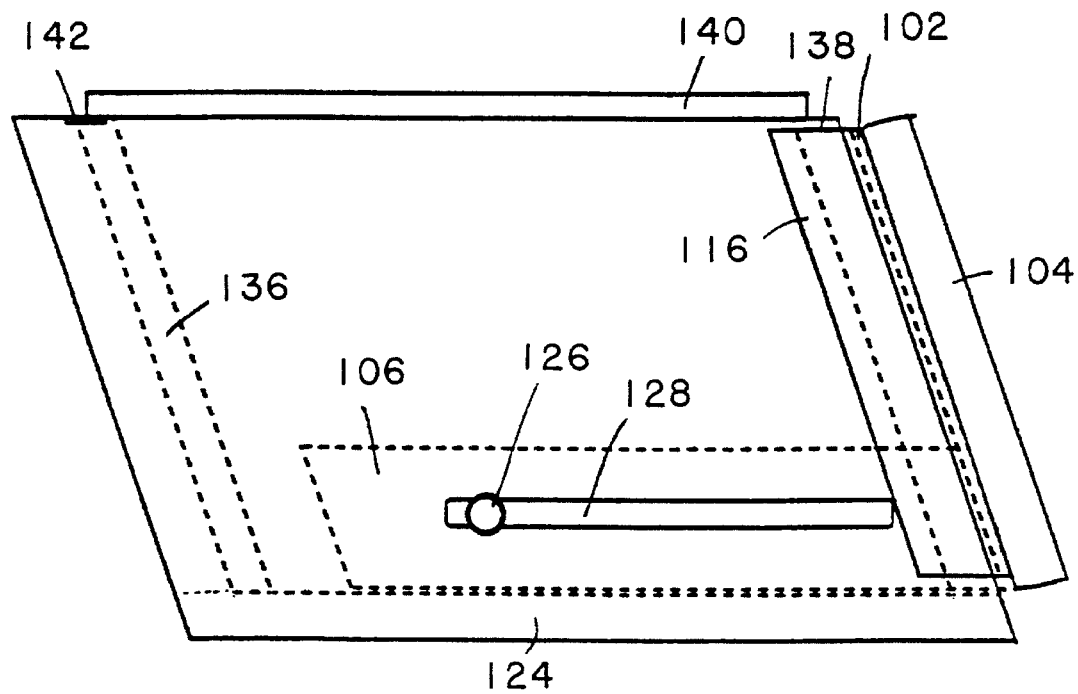
FIG. 14 represents a side view of an embodiment of the present invention including a backrest assembly, a backrest mounting assembly and a storage compartment.

FIG. 14 shows a side, partial cut away view of an embodiment of the present invention including a backrest assembly including a backrest member 102, a cushion 104 on the backrest member, two backrest assembly side members, one of which 116 is shown, and two backrest assembly base members, one of which 106 is shown. The backrest assembly side members each include an adjusting and securing member receiving passage (not shown). The backrest assembly is received by a backrest mounting assembly which includes two backrest mounting assembly side members, one of which 120 is shown, a backrest mounting assembly rear member 136, and a backrest mounting assembly front member 138. The backrest mounting assembly includes an adjusting and securing slot 128 through which an adjusting and securing member extends. The members of the backrest mounting assembly form a storage compartment which is closed with a storage compartment cover 140. The cover is articulably mounted on the backrest mounting assembly rear member 136.

The adjusting and securing member preferably extends through the adjusting and securing member receiving passage in the backrest assembly base members and may be secured from the outside or the inside of the storage compartment. In an embodiment in which the adjusting and securing member is secured from within the storage compartment, the adjusting and securing member may be a bolt. The bolt may be inserted into the adjusting and securing member receiving slots and/or passages and then secured in place with a nut attached to the bolt from within the storage compartment. Alternatively, the nut could be attached from the underside of the backrest mounting assembly base member. However, in such an embodiment, the backrest would need to be removed from the vehicle to accomplish the adjustment of the backrest assembly.

FIG. 15 shows an overhead view of an embodiment of the present invention including a backrest assembly and a backrest mounting assembly which includes a storage compartment. The backrest assembly includes a backrest member 102 and two backrest assembly base members 106 and 108. The backrest assembly also includes two backrest assembly side members 116 and 118. A foam padded cushion 104 is attached to the backrest member 102.

The backrest mounting assembly of the embodiment shown in FIG. 15 includes two backrest mounting assembly side members 120 and 122, a backrest mounting assembly front member 138, a backrest mounting assembly rear member 136, and a backrest mounting assembly base member 124.

The embodiment shown in FIG. 15 also includes a storage compartment formed by the backrest mounting assembly base member 124, the backrest mounting assembly side members 120 and 122, the backrest mounting assembly rear member 136, and a backrest mounting assembly front member 138. The storage compartment also includes a storage compartment cover 140 attached to the storage compartment rear member 136 with a pair of hinges 142. As can be seen in FIG. 15, the backrest mounting assembly side members 120 and 122 extend rearwardly beyond the rear edge of the backrest mounting assembly rear member.

The embodiment shown in FIG. 15 is secured to the motorcycle, scooter, moped, or other vehicle using a pair of straps 130 and 132 which are attached together with a fastener 134. The fastener used to secure the straps together may be buckle or clasp or some other type of fastener for joining two straps. Any type of known clasp such as is used on straps attached to car roof racks or a type used to secure ropes or straps on boats or a clasp as is often used on belt buckles or any other such known type of clasp may be used with the invention. The straps could also be tied together or joined using other means for fastening two straps. Additionally, more straps could be added to the backrest to further secure the backrest to the vehicle.

The straps 130 and 132 may be secured to the backrest mounting assembly using glue, screws, nails or any other type of fastener which may be used to secure such straps to the backrest mounting assembly. Alternatively, or in addition, the straps may be sandwiched between the backrest assembly rear member 136 and the backrest mounting assembly side members 120 and 122 or between the backrest assembly rear member 136 and the backrest assembly base member 124. The mounting straps are used to help secure the backrest to the motorcycle, scooter, moped, or other vehicle. The straps or other securing members may be mounted on the backrest at any location so as to allow the backrest to be secured to the vehicle.

To secure the backrest mounting assembly, the straps may be wrapped about the backrest or sissy bar on the motorcycle, scooter, or moped and then tightly secured in place with the clasp 134. These straps may instead or also be wrapped around any other part of the structure of the motorcycle, scooter, moped, or other vehicle so as to secure the mounting assembly on the vehicle.

The embodiment shown in FIG. 16 is similar to the embodiment shown in FIG. 15. Any of the embodiments shown in FIGS. 10–16 may be mounted on a motorcycle, scooter, moped, or other vehicle similarly to the embodiments shown in FIGS. 1–8 in a manner shown in FIG. 9, for example.

Any of the embodiments of the invention described above which include a storage compartment may have padding and/or a covering such as leather or vinyl, for example, covering a part of or all of the surfaces of the backrest assembly and backrest mounting assembly.

In this disclosure, there is shown and described only the preferred embodiments of the invention, but, as aforementioned it is to be understood that the invention is capable of use in various other combinations and environments and is capable of changes or modifications within the scope of the inventive concept as expressed herein.

What is claimed is:

1. An integral backrest and storage compartment adapted to be attached to a motorcycle, scooter, or moped, said backrest and storage compartment comprising:

a storage compartment base member adapted to be at least partially supported by an upper surface of a passenger seat of a motorcycle, scooter, or moped to which the integral backrest and storage compartment is attached;

two storage compartment side members attached on opposite sides of said storage compartment base member;

a storage compartment front member attached to said storage compartment base member and said storage compartment side members on a side of said storage compartment adapted to face a direction of travel of a motorcycle, scooter, or moped to which the integral backrest and storage compartment is attached;

a storage compartment rear member attached to said storage compartment base member and said storage compartment side members on a side of said storage compartment adapted to face away from a direction of travel of motorcycle, scooter, or moped to which the integral backrest and storage compartment is attached;

a storage compartment cover articulately joined to one of the group consisting of: said storage compartment rear member, said storage compartment front member, and said storage compartment side members;

at least one mounting strap adapted to secure said storage compartment to a motorcycle, scooter, or moped;

a backrest member, a front face of said backrest member adapted to provide support for a back of a rider of a motorcycle, scooter, or moped to which the integral backrest and storage compartment is attached;

at least one backrest mounting member extending rearwardly away from a rear face of said backrest member; and at least one backrest mounting member receiving slot provided in the face of said storage compartment adapted to face a direction of travel of a motorcycle, scooter, or moped to which the integral backrest and storage compartment is attached, said at least one backrest mounting member receiving slot for receiving said at least one backrest mounting member.

2. An integral backrest and storage compartment according to claim 1, further comprising two backrest mounting members extending rearwardly away from a rear face of said backrest member and two backrest mounting member receiving slots provided in the face of said storage compartment adapted to face a direction of travel of motorcycle, scooter, or moped to which the integral backrest and storage compartment is attached, said two backrest mounting member receiving slots for receiving said two backrest mounting members.

3. An integral backrest and storage compartment according to claim 2, wherein said backrest mounting members form about a 70° angle with backrest member.

4. An integral backrest and storage compartment according to claim 1, wherein said backrest mounting member forms about a 70° angle with backrest member.

5. An integral backrest and storage compartment according to claim 1, wherein said storage compartment side members extend downwardly beyond said storage compartment base member and are adapted to engage opposite sides of the seat of a motorcycle, scooter, or moped to which the integral backrest and storage compartment is attached.

6. An integral backrest and storage compartment according to claim 1, wherein said at least one mounting strap is adapted to be attached to a sissy bar of a motorcycle, scooter, or moped to which the integral backrest and storage compartment is attached.

7. An integral backrest and storage compartment according to claim 1, wherein said at least one mounting strap is adapted to be attached around a seat of a motorcycle, scooter, or moped to which the integral backrest and storage compartment is attached.

8. An integral backrest and storage compartment according to claim 1, further comprising a cushion attached to a face of the backrest member adapted to face a direction of travel of a motorcycle, scooter, or moped to which the integral backrest and storage compartment is attached.

9. An integral backrest and storage compartment according to claim 1, further comprising two backrest side members extending rearwardly from a rear face of said backrest member, said backrest side members engaging an outer surface of said storage compartment side members.

10. An integral backrest and storage compartment according to claim 1, further comprising:

at one backrest adjusting and securing member receiving slot provided in said at least one backrest mounting member;

at least one adjusting and securing member receiving passage provided in at least one of said storage compartment side members, wherein said at least one adjusting and securing member receiving slot is aligned with said at least one adjusting and securing member receiving passage;

an adjusting and securing member inserted into said at least one adjusting and securing member receiving slot and said at least one adjusting and securing member receiving passage, said adjusting and securing member securing the backrest member in a desired position, wherein the at least one adjusting and securing member receiving slot permits the backrest member to be secured in a variety of positions.

11. An integral backrest and storage compartment according to claim 1, wherein said storage compartment rear member forms an angle with said storage compartment base member wherein said angle is adapted to be substantially similar to an angle between a seat and a backrest or a sissy bar of a motorcycle, scooter, or moped to which the integral backrest and storage compartment is attached.

12. An integral backrest and storage compartment according to claim 1, wherein said storage compartment rear members extend rearwardly beyond said storage compartment rear members such that the storage compartment rear members are adapted to engage sides of a backrest or a sissy bar on a motorcycle, scooter, or moped to which the integral backrest and storage compartment is attached.

* * * * *